United States Patent [19]
Fischer

[11] 3,728,426
[45] Apr. 17, 1973

[54] METHOD OF AND APPARATUS FOR MAKING HOLLOW ARTICLES

[76] Inventor: Stefan Fischer, Im Korresgarten 21, Lohmar, Germany

[22] Filed: Sept. 28, 1970

[21] Appl. No.: 76,656

[30] Foreign Application Priority Data

Sept. 27, 1961 Germany.....................P 19 48 978.2

[52] U.S. Cl....................................264/97, 425/324
[51] Int. Cl................................................B29c 17/07
[58] Field of Search..........................264/94, 97, 98; 425/324, 326, 387

[56] References Cited

UNITED STATES PATENTS 3,283,046  11/1966  E. G. DeWitt et al...........264/94 X

Primary Examiner—Robert F. White
Assistant Examiner—J. H. Silbaugh
Attorney—Lilling & Siegel

[57] ABSTRACT

A method and apparatus for producing hollow thermoplastic articles, especially bottles. Pre-mouldings are formed by injection moulding and are transferred to a blow mould for shaping into the desired articles. Chamber or protective zone means are provided for screening the pre-mouldings from external influences as they are removed from the injection mold and transferred to the blow mould.

8 Claims, 2 Drawing Figures

PATENTED APR 17 1973 3,728,426

INVENTOR
STEFAN FISCHER
BY Lilling & Siegel
ATTORNEYS

METHOD OF AND APPARATUS FOR MAKING HOLLOW ARTICLES

The present invention relates to a method of and an apparatus for the production of hollow articles, especially bottles, from thermoplastic synthetic plastic material, utilizing a pre-moulding formed by the injection-moulding method, which pre-moulding after removal from the injection mould is brought into a blow mould and there blown into the finished article.

BACKGROUND OF THE INVENTION

In the production of hollow articles according to the above-described so-called injection and blow-moulding method, and in particular the processing of highly delicate materials, such for example as hard PVC (polyvinylchloride), difficulties can occur inasmuch as the pre-mouldings burst on one side on blowing in the blow mould, so that a high percentage of waste occurs. These drawbacks and difficulties are avoided and are eliminated by the present invention.

For this purpose, in a method for the production of hollow articles of the initially stated kind, where a pre-moulding is formed by the injection-moulding method which is brought after removal from the injection mould into a blow mould and there blown into the finished articles, the invention provides that the injection pre-moulding, directly after or even during the removal from the injection mould, is brought into a chamber which encloses it as extensively as possible and is brought in this chamber to the blow mould, which is closed around it after the removal of the chamber. These measures achieve the object that the injection pre-moulding, which after removal from the injection mould is still very delicate and must sometimes even carry out a temperature equilisation in its interior during conveying into the blow mould, is largely screened or insulated against external influences. Under some circumstances it may suffice here, which must be considered from case to case, to provide one single chamber for two or more pre-mouldings removed from the injection mould, through which chamber the pre-mouldings are moved during conveying. Under some circumstances one single chamber extending over the entire conveying path is even sufficient.

In an apparatus for the production of hollow articles from thermoplastic synthetic plastic material having an extruder, an injection mould and a blow mould and conveyor devices for the pre-moulding which bring the latter from the injection mould into the blow mould, suitable especially for carrying out the method as described above, the invention further provides that protective means, such as chamber-type or housing-type protective elements enclosing the pre-moulding after removal from the injection mould are allocated to the conveyor devices. These chamber-type protective elementa as a rule should be movable further together with the conveyor devices of the pre-mouldings, but in particular cases may be stationary. The chamber-type protective elements can be formed by two chamber or housing halves which can be moved apart and together, the opening and closing movements of which are controllable in the working sequence of the apparatus. Furthermore, they may possibly also be movable forward and back in relation to the conveyor devices in the conveying direction thereof.

BRIEF DESCRIPTION OF THE DRAWING

The invention permits manifold possible embodiments, and will be explained in greater detail hereinafter by reference to a form of embodiment of an apparatus suitable for carrying out the method according to the invention which is represented by way of example in very diagrammatic form, with the parts essential to understanding, in the accompanying drawing, wherein.

DESCRIPTION OF THE PREFERRED EMBODIMENT

Figure 1:
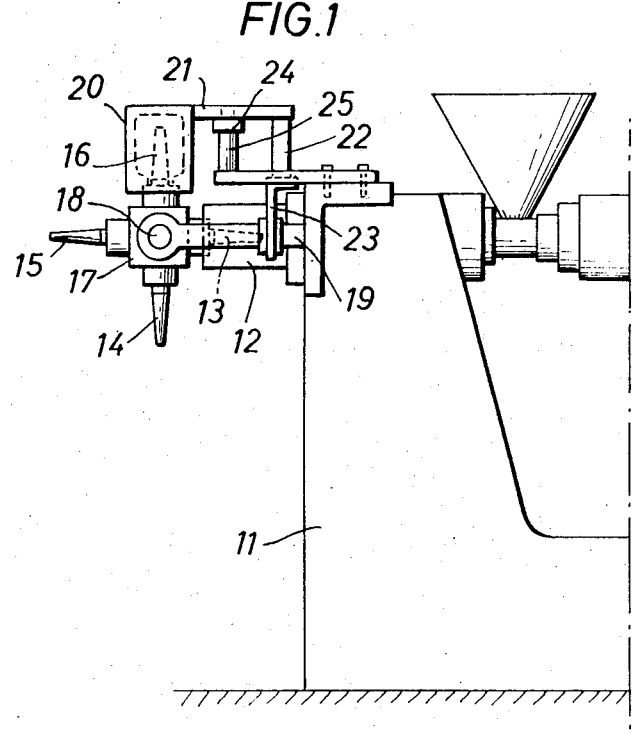
FIG. 1 shows a side elevational view of the apparatus of the invention.

In the drawing, an extruder is designated by reference numeral 11, and it presses the plasticised synthetic plastic composition into an injection mould 12 into which a mandrel 13 serving as a mould core extends from the opposite side. The mandrel 13 is arranged wih three further similar mandrels 14, 15 and 16 on a hub 17, the shaft 18 of which is carried by arms 19 which are axially displaceably mounted in the machine frame. For the removal of the pre-moulding, formed in the mould 12, from the mould the hub 17 is moved to the left in the drawing with its mandrels 13, 14, 15 and 16 by means of the arms 19.

The hub 17 then pivots through 90° so that the mandrel 16 shifts to before the opening of the injection mould 12 and the arms 19 can be moved in the opposite direction again for the closing of the injection mould. Under the control of the movement of the arms 19, the blow mould 20 is at the same time closed around the mandrel 16 situated in the upper position. The two halves of the mould are carried by the two arms 21 which are pivotable in tongs about a pivot spindle 22. This pivot spindle 22 is carried by a yoke plate 23 which is connected with the arms 19 and moves with them. The pivot arms 21 of the mould halves 20 are connected by support links 24 with a fixed bracket 25 of the machine frame. When the arms 19 are moved back and forth the pivot axis 22 is in each case shifted by the same amount. Thus the points of articulation of the support links 24 on the pivot arms 21 move in relation to their points of articulation on the brackets 25, so that the support links 24 are swung about their points of articulation on the brackets 25 until they lie approximately in one direction and press the pivot arms 21 with the two halves of the mould 20 against one another.

Figure 2:
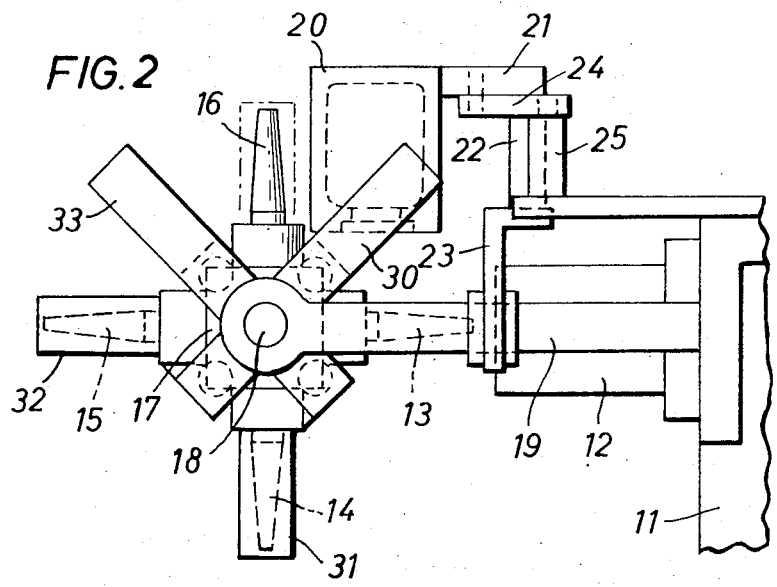
FIG. 2 shows a fragmentary view of the upper left part of the apparatus showing FIG. 1, but in a greatly enlarged scale and in the separated position.

On the hub 17 there are mounted in addition to the mandrels 13, 14, 15 and 16 four pairs of protector elements 30, 31, 32 and 33 which are movable not only in the direction of the shaft 18 but also about the circumference. It is assumed that in the position shown in FIG. 2 the mandrel 13 has just been brought out of the injection mould 12. While it is being brought out the two halves 30 of the guard chamber can already swivel by about 45°, up to the level of the mandrel 13, and then, or immediately afterwards, close around the mandrel. The hub 17 then swivels through 90° so that the position of the mandrel 14 and the chamber 31 is reached. By way of the position of the mandrel 15 and the chamber 32, the position of mandrel 16 is finally reached, whose chamber is marked with dotted lines. From this dotted line position, the two chamber halves, after being separated from one another, are swiveled back into the position of the chamber halves 33 before the blow mould 20 closes around the mandrel 16. After the blow mould has been opened, the chamber halves can be swiveled back again as the mandrels index, from the position of the halves 33 back to the position of the halves 30. Control of the movement of the guard chamber halves is simply achieved by means of springs and guide cams which move the chamber halves apart against spring pressure as they move back into the intermediate position of the halves 33 and which close during the movement from the position of the halves 30 to the level of the mandrel 13.

While the invention has been shown, illustrated, described and disclosed in terms of embodiments or modifications which it has assumed in practice, the scope of the invention should not be deemed to be limited by the precise embodiments or modifications herein shown, illustrated, described and disclosed, such other embodiments or modifications intended to be reserved especially as they fall within the scope of the claims here appended.

What is claimed is:

1. An improved method for the production of hollow articles from highly delicate thermoplastic material, such as polyvinylchloride and the like, comprising the steps of forming a pre-moulding in an injection mould, removing and transferring said pre-moulding from said injection mould into a blow mould, blowing said pre-moulding into a finished article, protecting said pre-moulding from external influences upon removing said pre-moulding from said injection mould and as said pre-moulding is transferred from said injection mould to said blow mould, and blow forming said hollow articles so as to achieve a uniformly thin wall article.

2. The method according to claim 1, the protecting step comprises the use of movable chambers with which at least one pre-moulding removed from the injection mould is moved during conveying from said injection mould to said blow mould.

3. The method according to claim 1, wherein said pre-mouldings are moved during conveying into said blow mould through a protective zone in the form of a single stationary chamber extending over the entire conveying path.

4. An improved apparatus for the production of hollow articles from highly delicate thermoplastic material, such as polyvinylchloride and the like, comprising in combination, an injection mould for forming pre-mouldings, a blow mould for blowing the pre-mouldings into finished articles, conveyor devices for transferring the pre-mouldings from said injection mould into said blow mould, means for blowing the pre-mouldings into the finished articles, means acting as a pretective zone for protecting said pre-moulding from external influences upon removing said pre-moulding from said injection mould and during the transferring of said pre-moulding from said injection mould to said blow mould, and means for blow forming said hollow articles so as to achieve a uniformly thin wall article.

5. The apparatus according to claim 4 wherein said means acting as a protective zone means is moved together with said pre-moulding and its associated conveyor device.

6. The apparatus according to claim 4, wherein said means acting as a protective zone means is stationary.

7. The apparatus according to claim 4, wherein said means acting as a protective zone is formed by two chamber halves adapted to be moved apart and together in synchronism with the operation of said apparatus.

8. The apparatus according to claim 4, wherein said means acting as a protective zone is moveable back and forth in the conveying direction of the conveyor devices in relation to said conveyor devices.

* * * * *